June 27, 1967  R. E. SOLOMON  3,327,950
FLUID-FLOW CONTROL DEVICE
Filed March 28, 1966  2 Sheets-Sheet 1
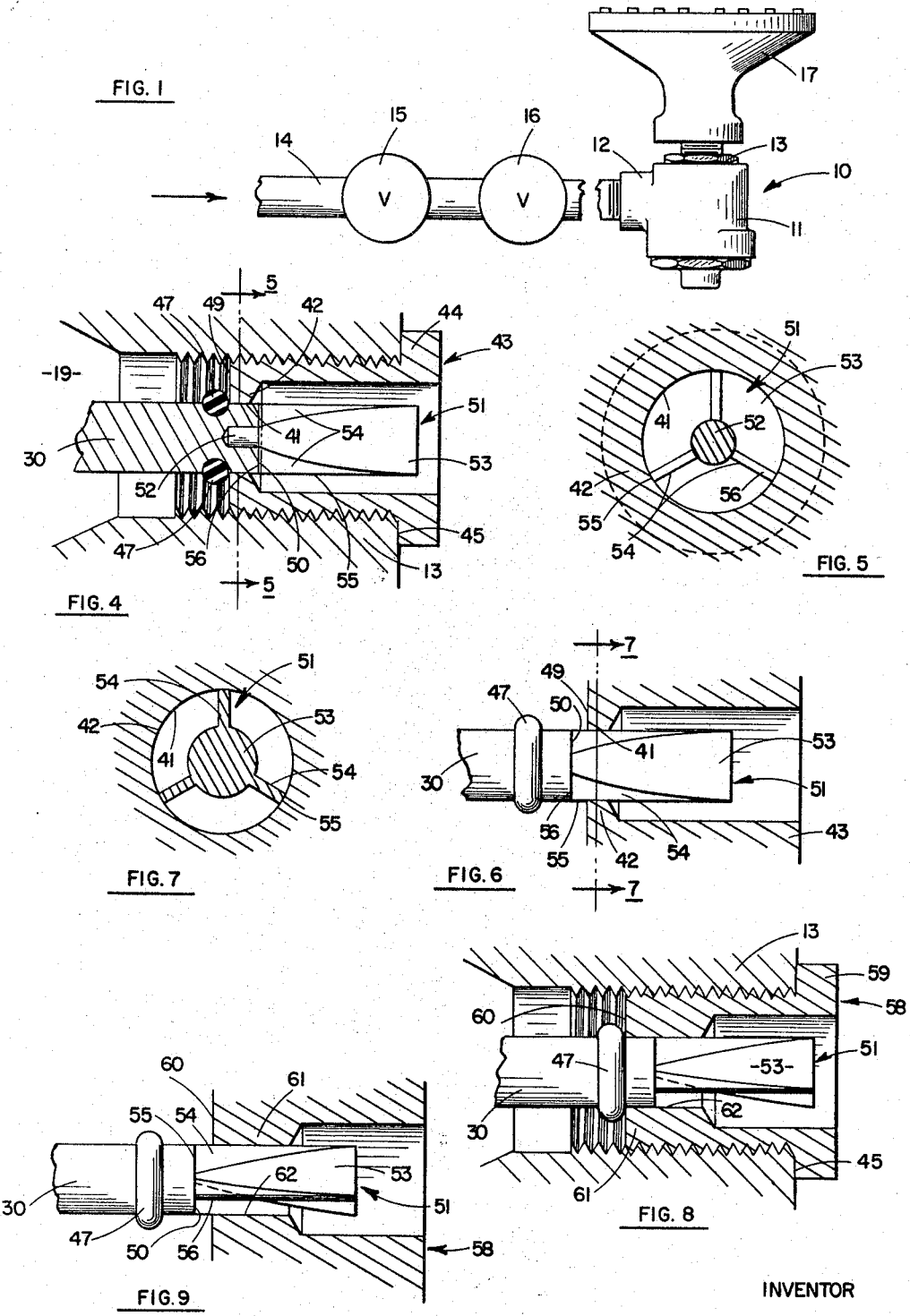
INVENTOR
RALPH E. SOLOMON
BY
*Gaventy & Carr*
ATTORNEYS June 27, 1967   R. E. SOLOMON   3,327,950
FLUID-FLOW CONTROL DEVICE
Filed March 28, 1966   2 Sheets-Sheet 2

INVENTOR.
RALPH E. SOLOMON
BY
ATTORNEYS

United States Patent Office 3,327,950
Patented June 27, 1967

3,327,950
FLUID-FLOW CONTROL DEVICE
Ralph E. Solomon, Los Angeles, Calif., assignor to Deutsch Controls Corp., Los Angeles, Calif., a corporation of California
Filed Mar. 28, 1966, Ser. No. 543,473
14 Claims. (Cl. 239—533)

ABSTRACT OF THE DISCLOSURE

A flow-regulating device having a chamber in which is a diaphragm, one side of the diaphragm being reacted upon by fluid pressure for moving a stem in an orifice to decrease flow area with increased movement. A snap action is provided by a magnet serving also as a seal.

---

This application is a continuation-in-part of my copending patent application Ser. No. 474,589, filed July 26, 1965, now abandoned.

This invention pertains to the control of the flow of fluid and in particular to regulating the flow of gaseous fuels.

Gas-fired heating appliances are constructed to operate at a predetermined energy input depending upon the size of the appliance and its purpose. Such appliances are required to be constructed so as to operate satisfactorily, however, within a range of energy inputs. In other words, the appliance must be designed so that it will be safe and generally function in its intended manner when the energy input falls within prescribed limits. Normally, this is from 12% above to 80% below the rated input of the appliance. It is greatly preferred, however, to keep within ±5% of the rated energy input. In order to limit the gas flow at the burner of such an appliance to hold the energy input close to the rated value, it has been the practice to include an orifice of appropriate dimension to restrict the fluid flow. It can be demonstrated that the energy flow to such an appliance will vary directly with the area of the orifice and with the square root of any pressure change in the gaseous fuel supply. With the conventional orifice constituting a fixed restrictor in the system, it is necessary then to provide close control of the fuel pressure in order to assure safe operation. Consequently, it is customary practice to include a pressure regulator in any gas-fired heating appliance, intended to control the pressure downstream of it so that the flow rate through the orifice will be within a relatively narrow range.

Conventionally, the gas pressure regulator is located upstream of the orifice in any appropriate location consistent with the design criteria involved in the system. In this manner, the energy input to the burner can be governed. These regulators have certain serious deficiencies, however, and can permit unsatisfactory and unsafe operation at the burner. For one thing, these regulators are designed so that, when there is no gas pressure in the system, the regulator restrictor assumes a wide open position. Hence, when any flow of gas later is generated, initially there is no restriction and maximum flow is permitted. Only when the regulator and the passageways downstream become filled with gas will the pressure build up and the regulator come into operation to react to the pressures present and throttle the flow. Upon opening of the thermostatic valve of the system, therefore, there is an initial period of time in which unrestricted flow of gas goes past the regulator and to the burner. This surge of gas provides the burner with a momentary excess and, as a result, large flames roll out from the burner area. Obviously, this flame roll-out is a safety hazard, particularly severe for appliances at higher inputs.

Although the usual thermostatic control valves are intended to snap on and off rapidly so that there is instantaneous opening or closing of the flow of gas past the thermostat valve, in actual practice it frequently occurs that much more gradual movement takes place. This may mean, therefore, that for finite periods of time small amounts of gas pass through the thermostatic valve and downstream through the regulator to the burner. This small flow will be insufficient to cause a contemporary regulator to restrict the passageway through it, because the regulator normally is in an open position and is moved to a restricted position only when appreciable pressure is present in the system. Consequently, the leakage resulting from gradual opening and closing of the thermostatic valve can reach the burner and cause a flashback from the burner to the orifice, with resulting sooting of the burner and the appliance.

Perhaps the most significant shortcoming of conventional pressure regulators is the danger resulting from their lack of a fail-safe provision. These regulators include a diaphragm that is reacted upon by the gas to move a valve to a restricted or throttled position in accordance with the pressure existing at the regulator. As pointed out above, when there is no pressure on the diaphragm, the valve will assume a full-open position. Occasionally, a diaphragm will become punctured, or a leak will occur around the diaphragm so that its function is nullified. When this happens, the conventional regulator will remain in the wide-open position, allowing maximum gas flow without restriction. This permits excessive pressures to be applied at the orifice so that the burner input may far exceed the prescribed limits. This can create a dangerous fire hazard, and the life of the appliance will be impaired as well.

The present invention provides an improved fluid-flow regulator that overcomes such disadvantages, providing a unit of superior performance that renders the system much safer than conventional flow regulators. The regulator of this invention incorporates the controlling orifice, and may be mounted directly at the burner rather than upstream from it. It includes a body having a gas inlet leading to a chamber where the pressurized gas can react against a diaphragm, from which extends a stem having a contoured pin on its distal end. Under low pressure conditions, the stem is positioned to close off the flow through the orifice fitting. The orifice pin at the end of the stem can be brought into the opening through the orifice fitting by axial movement of the stem, where it allows flow through the orifice but presents an obstruction varying in size with the relative axial positions of the pin and orifice opening. This allows gas to escape from the body to the burner, while throttling the flow to control its rate. Upon initial movement of the stem, a large cross-sectional area is provided, which decreases as the pin is shifted axially by the stem. This movement of the stem and its pin comes about from the pressure of the gas within the body reacting against the diaphragm. The latter member is spring-loaded to urge the stem into the orifice opening so that the orifice remains closed until sufficient pressure has built up inside the body to cause the diaphragm to move the stem and orifice pin. The components are coordinated so that, when adequate pressure is present to assure proper burner operation, minimum movement of the stem from pressure against the diaphragm will open up a relatively large flow area so that the burner can give a desired energy output. As gas pressure increases, the flow area is reduced by continued movement of the diaphragm so that the energy input to the burner will remain substantially constant despite the pressure changes. The unit will fail safe in the event of a diaphragm puncture because the diaphragm spring will move the stem into the orifice opening to prevent flow.

A magnet preferably is included to cooperate with the diaphragm spring in resisting movement of the diaphragm in response to the gas pressure. This may be an elastomeric magnet in the form of a collar on the stem. When the gas pressure is sufficient to overcome both the spring and magnet, the outlet opens rapidly with a snap action as the force of the magnet drops out due to an opening gap. The device, with the snap acting outlet opening, may be used as a quick-opening valve when the orifice pin is omitted.

The regulator will control low density gas, such as natural or manufactured gas, and also can be used for the gases of higher specific gravity, such as propane, butane and various mixtures. The same unit is operative for the various types of gases merely by changing the orifice fitting, which thereby governs the pressure at which the regulator will open and the contour of the flow path through the orifice after the flow of gas to the burner has commenced.

An object of this invention is to provide an improved fluid-flow regulator.

Another object of this invention is to provide a fluid-control device having a snap action to the initial movement of the flow-controlling member.

Another object of this invention is to provide a gas-flow regulator that incorporates a fail-safe feature, shutting off the flow of gas in the event of failure.

A further object of this invention is to provide a gas-flow regulator that remains closed when no pressure is in the system, and opens only at a predetermined rate when prescribed pressures are present.

An additional object of this invention is to provide a gas-flow regulator that incorporates the controlling orifice and can be mounted directly at the inlet face of the burner.

Yet another object of this invention is to provide a gas-flow regulator of small size but which nevertheless permits a high flow rate.

A still further object of this invention is to provide a gas-flow regulator which is operable with fuels of various specific gravities including those of higher specific gravity.

An additional object of this invention is to provide a gas-flow regulator in which the flow characteristics can be varied by merely changing an easily removable orifice fitting so that a single unit without further modification can be utilized with gases of different specific gravities.

These and other objects will become apparent from the following detailed description taken in connection with the accompanying drawing in which:

FIGURE 1 is a schematic diagram of a gas supply system utilizing the regulator of this invention;

FIGURE 4 is an enlarged fragmentary sectional view taken along line 4—4 of FIGURE 2, illustrating the orifice fitting and associated elements;

FIGURE 5 is a transverse sectional view taken along line 5—5 of FIGURE 4;

FIGURE 6 is a view similar to FIGURE 4 but with the orifice pin moved into the orifice opening;

FIGURE 7 is a transverse sectional view taken along line 7—7 of FIGURE 6;

FIGURE 8 is a fragmentary sectional view similar to FIGURE 4 but illustrating the device with a different orifice fitting for gases of higher specific gravities;

FIGURE 9 is a view similar to FIGURE 8 but with the orifice pin moved into the orifice opening;

Figure 3:
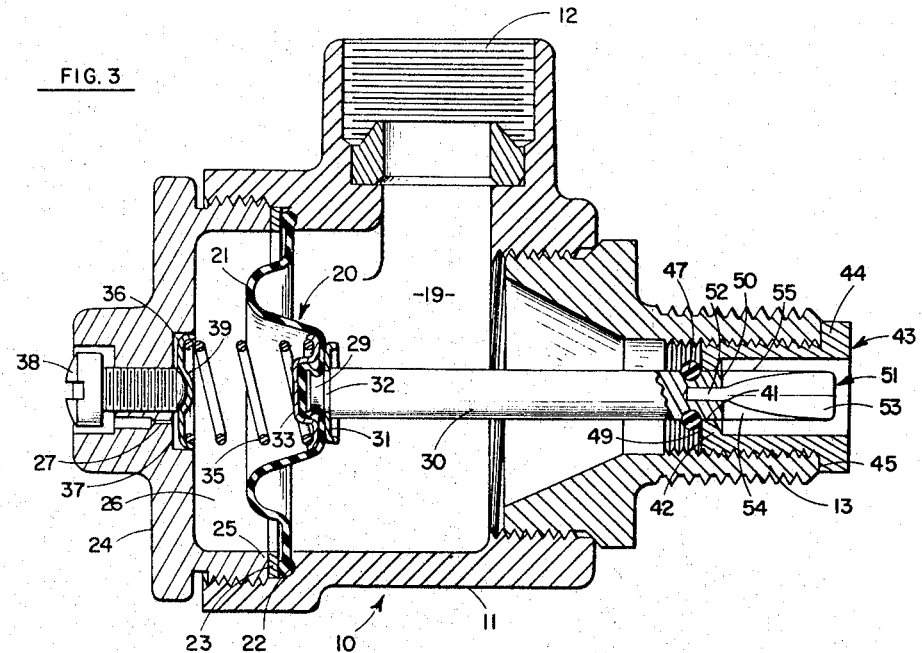
FIGURE 3 is a sectional view of the regulator taken along line 3—3 of FIGURE 2.

The regulator 10 of this invention includes a body 11 having an inlet 12 and an outlet 13. It is adapted for connection in the supply circuit for a gas burner in the manner indicated schematically in FIGURE 1. Thus, the gas supply line 14 is connected to the inlet 12 of the regulator 10, downstream of the normal safety pilot shutoff valve 15 and the thermostat valve 16 normally incorporated in the system for a gas-fired appliance. The outlet 13 of the regulator 10 connects directly to the primary air face plate of the burner 17, rather than being spaced upstream of the burner as in installations of conventional flow regulators.

As seen in FIGURE 3, the inlet 12 leads to a chamber 19 across one side of which is a diaphragm 20. The latter element is a molded sheet of fluid-impervious elastomeric material having an arcuate portion 21 where flexure can take place. The bead 22 of the diaphragm fits in a complementary groove in a shoulder in the body, where it is held by a washer 23. A closure cap 24 is secured to the body 11 by screw threads or other suitable means, and has an inner portion 25 that bears against the washer 23 so that the diaphragm bead is held in place. This defines an additional chamber 26 on the side of the diaphragm 20 opposite from the chamber 19 of the body, bounded by the closure cap 24 and sealed with the exception of a small capillary vent 27.

The central portion of the diaphragm 20 is shaped so that it fits within a groove 29 in a stem 30 that projects outwardly from the diaphragm through the chamber 19. A retainer washer 31 snaps into the annular recess 32 adjacent the groove 29, holding the diaphragm on the side of the chamber 19. On the opposite side of the diaphragm is a plate 33 that is cup-shaped to receive the contoured central portion of the diaphragm. The plate 33 and the washer 31 cooperate to secure the diaphragm 20 to the stem 30 at the groove 29. Consequently, any movement of the diaphragm is imparted to the stem 30.

The diaphragm 20 is spring-loaded toward the chamber 19 by a compression spring 35, one end of which bears against the plate 33. The opposite end of the spring 35 is received in a washer 36 located in a recess 37 in the central part of the closure cap 24. The force exerted by the spring 35 on the diaphragm 20 can be controlled through rotation of a screw 38 that is threadably received in the closure cap 24, and at its rounded inner end is received in an indented portion 39 of the washer 36. The adjustment through the screw 38 is made upon manufacture, constituting a permanent setting that need not be varied afterward.

The stem 30 extends outwardly from the diaphragm 20 through the chamber 19 into the gas outlet fitting 13. The force of the diaphragm spring 35 biases the distal end of the stem 30 into an opening 41 formed in the inner end wall 42 of an orifice fitting 43. The latter member is threaded into the outlet 13 to bring its radial flange 44 into engagement with the outer edge surface 45 of the outlet fitting 13. This accurately positions the inner wall 42 of the orifice fitting 43 at a known location along the axis of the outlet fitting 13. Hence, the end wall 42 and the orifice opening 41 are at a predetermined position with respect to the body and the diaphragm 20.

The periphery of the distal end of the stem 30 can slide axially with respect to the opening 41, but is accurately fitted so that it provides a substantially fluid-tight seal. In addition, an O-ring 47 projects outwardly from a groove circumscribing the stem adjacent the distal end, and can be brought into contact with the inner surface 49 of the wall 42 by the spring 35 that pushes the diaphragm and the stem 30 toward the orifice. The engagement of the O-ring 47 with the surface 49 limits the travel of the stem 30 in response to the urging of the spring 35, and provides an additional seal at the location of the orifice opening 41.

Projecting axially from the radial surface 50 at the distal end of the stem 30 is an orifice pin 51. The latter member includes a short cylindrical section 52 press-fitted into an opening extending axially into the stem 30. From the portion 52 extends the main body 53 of the orifice pin 51, which has the contour of a surface of revolution that increases progressively in diameter from the part adjacent the end wall 50 of the stem 30. The outer end of the body 53 has substantially the same diameter as that of the stem 30. Three guide blades 54 are equally spaced about the periphery of the body 53 and have outer longitudinal edges 55 aligned with the circumferential surface of the stem 30. The inner edges 56 of the blades 54 are brought into abutment with the end wall 50 of the stem 30 when the orifice pin 51 is installed at the end of the stem.

As a result of this construction, the outlet of the chamber 19 will be blocked when the thermostat valve or other valve upstream of the regulator 10 is closed. This is because the spring 35 forces the diaphragm 20 to the right as the device is illustrated, so that the end portion of the stem 30 enters the orifice opening 41, as shown in FIGURES 3 and 4. Upon opening of the upstream valves, gas under pressure entering the chamber 19 through the opening 12 can overcome the resistance of the spring 35 to deflect the diaphragm 20 to the left. This, of course, draws the stem 30 in the same direction, moving the end portion of the stem 30 inwardly of the chamber 19. As this movement takes place initially, the orifice 41 remains closed due to the close fit between the circumference of the stem 30 and the orifice opening 41, even though the O-ring 47 is moved away from the end wall 42 of the orifice fitting 43. If the pressure builds up to a sufficient value, however, the end wall 50 of the stem 30 will pass the inner surface 49 of the end wall 42 of the orifice fitting 43, so that there is an open passageway between the surface of the orifice opening 41 and the periphery of the body 53 of the orifice pin. The narrowest portion of the orifice body 53 is adjacent the end wall 50 of the stem so that as soon as the orifice is opened there is a relatively large flow passageway through it. The size of this flow area depends upon the difference between the diameter of the opening 41 and the diameter of the body portion 53 that is adjacent the orifice opening. Therefore, when a predetermined gas pressure has been generated in the chamber 19, the outlet is opened suddenly to give a relatively large flow passageway for the gas to be conducted to the burner 17.

If the pressure within the chamber 19 increases, the diaphragm 20 will be deflected further to the left, pulling the stem 30 with it in the same direction. This will shift the orifice pin body 53 such that a portion of larger diameter enters the orifice opening 41. This effect may be seen in FIGURES 6 and 7. When this occurs, the increased size of the orifice pin body 53 at the opening 41 reduces the area of the opening through the orifice 41 through which the gas may flow. Consequently, the orifice provides a greater resistance to movement of the gas as the pressure of the gas goes up. A further pressure rise will shift the body 53 further into the opening 41 so that the flow area continues to go down as pressure goes up. During the time the orifice pin 51 is in the orifice opening 41, it will be centered accurately by the outer edges 55 of the guide blades 54.

The contour of the orifice pin body 53 is carefully shaped to provide the burner with precisely the correct quantity of the gaseous fuel. As mentioned above, the desired energy input for a gas burner varies directly with orifice area and with the square root of the gas pressure. This is expressed in the formula:

$$\frac{\text{Desired energy input}}{\text{Fuel heat content}} = K \times \text{orifice area} \sqrt{\frac{\text{gas pressure}}{\text{gas specific gravity}}}$$

where K is a constant. The configuration of the pin body 53, as well as the size of the orifice and the movement imparted to the diaphragm 20, are correlated so that the burner energy input remains substantially constant in accordance with this formula. This gives an accurate metering of the gas that the burner receives so that, as the gas pressure becomes larger, the flow area through the orifice is made less.

Moreover, the stem 30 will not be moved sufficiently to open the orifice until there is adequate pressure to assure correct burner operation. The spring-loading on the stem 30 also means that in the event of a puncture or leakage at the diaphragm 20 the outlet will be closed because there will be no force to overcome the spring. This is an important fail-safe feature of the regulator of this invention.

In the construction described above, the orifice fitting 43 provides generally the effect of a sharp-edged orifice in view of the thin wall 42 provided at the opening 41. This configuration is suitable for use with natural or manufactured gases which have relatively low specific gravity. The regulator can be used also for liquid petroleum-type gases having higher specific gravities simply by changing the orifice fitting to the fitting 58, as seen in FIGURES 8 and 9. The remaining components of the device may be the same as before.

One difference between the fittings 43 and 58 is that the latter is longer than the fitting 43 so that, when it is threaded into the opening in the outlet 13 to where its flange 59 engages the surface 45, the inner radial surface 60 of the wall 61 of the fitting 58 is positioned further within the outlet 13 than is the case for the wall surface 49. This means that, when the O-ring 47 is brought into contact with the surface 60, the stem 30 will not have moved as far to the right as in the previously described embodiment. Consequently, the spring 35 is under greater compression than is the case for the no-pressure condition in the embodiment utilizing the fitting 43.

The end wall 61 also is made thicker than the wall 42 so that the orifice opening 62 is of significant length and defines a flow passage differing from a sharp-edged orifice.

Because of the fact that the spring 35 is under greater compression in the arrangement of FIGURES 8 and 9, it offers more resistance to the movement of the diaphragm 20 than where the stem is allowed to move further into the outlet as is the case for the orifice fitting 43. Consequently, it takes a higher pressure within the chamber 19 to impart initial movement to the stem 30 than before. This means, therefore, that for gases of higher densities greater pressures are needed before the orifice opening will be uncovered and gas can flow to the burner. This is in accordance with the requirement for burners for such gases because the heavier gases will not burn properly at low pressures. Typically, the orifice aperture 62 will not be opened until the pressure in the chamber has reached 8 inches water column. This contrasts with a 2½ inches water column pressure to open the orifice 41 that is intended for natural gas.

Also, when the orifice is opened at the higher pressures, a greater resistance to flow is provided than upon the initial opening of the orifice 41. The outer surface 63 of the wall 61 is adjacent a considerably larger portion of the pin body 53 than is the corresponding surface of the orifice fitting 43 upon initial opening of the orifice. The entire length of the opening 62, together with the corresponding portions of the surface of the pin body 53, are effective in restricting the flow of the gas that is conducted through the orifice to the burner. Again, the flow characteristics will follow the formula set out above with orifice area decreasing as gas pressures become greater. With proper proportioning of the length and axial position of the orifice opening 62, the desired energy input will be held closely as the effect of the higher gas specific gravity and heat content is taken into account.

Rather than varying the length of the orifice opening for the orifice fitting when converting to liquefied petroleum gas, as in the embodiment of FIGURES 8 and 9, it is possible also to merely extend the length of the fitting so that the end wall 42 is further inside the chamber 19, while retaining the sharp-edged orifice characteristics at the end wall. This type of construction provides the fitting for liquefied petroleum gases with essentially the same configuration as that for the natural gases as shown in FIGURES 4 and 6, with an end wall comparable to the wall 42 in thickness. However, the liquefied petroleum gas fitting is longer, positioning the inner surface of the orifice fitting further within the chamber 19 so that the pressure must build up to a greater value before it is adequate to overcome the diaphragm spring force and open the orifice.

Hence, the design of this invention can be utilized for any gas by a simple change of one fitting. This means that the regulator is universal in its performance, greatly simplifying the manufacture and inventory requirements with the use of the regulator.

The design of this invention, therefore, offers significant advantages over conventional regulator construction, despite the fact that it is of small size and can be manufactured economically. As pointed out above, it is devised so that no flow will occur until an established amount of pressure is built up in the supply system. Therefore, no low pressure leakage to the burner can take place. Immediately upon opening of the outlet passage, the pin and orifice provide complete regulation of the flow. No uncontrolled surges are possible as the outlet passageway always is restricted properly through the pin in the orifice opening as positioned by the pressure of the incoming gas. Throughout the range of pressures encountered in the supply system the flow will be regulated with precision to assure virtually a constant energy input. The contoured orifice pin, cooperating with the orifice opening, governs the energy supply in accordance with the necessary requirements for constant energy input, decreasing the orifice area as the gas pressure rises. In addition, unlike conventional designs, the device will fail safe if leakage should occur at the diaphragm. Leakage at the diaphragm will result in equal pressures on both sides of it so that there will be no opposition from the gas pressure to the force of the diaphragm spring. Therefore, the spring will move the pin into the orifice opening, and all gas flow will be shut off.

Figure 10:
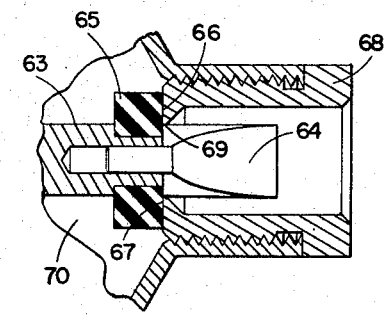
FIGURE 10 is a fragmentary sectional view of the outlet portion of a modified regulator construction in which a magnet is used in holding the device in a closed position.
Figure 2:
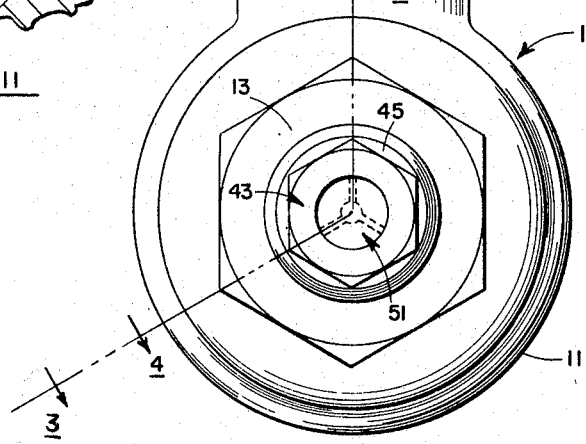
FIGURE 2 is an end elevational view of the regulator.

In the embodiment of FIGURE 10, an added advantage is realized in that the orifice is opened with a snap action when the appropriate pressure has been reached. In this construction, the stem 63, corresponding to the stem 30 of the previously described arrangements, carries an orifice pin 64 that is comparable to the pin 51. The stem 63, adjacent its distal end where the pin 64 is attached, is reduced in diameter to receive a collar 65. The latter member is square in cross section, presenting a flat side 66 adjacent the flat end wall 67 of the orifice fitting 68.

The collar 65 not only acts as a seal to preclude all flow of gas from the regulator chamber through the orifice opening 69 when the pressure is below a predetermined value, but also is a permanent magnet. Thus, the annular member 65 appropriately is an elastomeric magnet, such as an elastomer containing finely divided magnetized barium ferrite. In order that there will be an attraction at the orifice, the fitting 68 is of a magnetic material, typically a ferritic stainless steel because of its corrosion resistance.

When the pressure in the chamber is below the set value for opening the orifice outlet, the magnet 65 is held firmly against the end wall 66 of the orifice fitting 68. This force comes not only from the diaphragm spring, but also directly at the area of contact from the attraction of the magnet. This gives complete assurance that a seal will be effected and that no leakage of gas will occur.

Subsequently, when the upsteam thermostat valve is opened, the chamber 70 will receive gas under pressure, ultimately building up so as to exert a force on the diaphragm sufficient to overcome the spring force. Under these circumstances, the diaphragm, stem and orifice pin would begin to move if the unit were constructed in the manner shown in FIGURE 3. However, with the modification of FIGURE 10, there is now present an added force resulting from the flux field of the magnet 65. Therefore, the gas pressure must overcome both the diaphragm spring and the magnetic force before movement can take place. As soon as the critical pressure is reached so that the fluid force overcomes the magnet as well as the spring, the stem 63 is moved to the left as the device is shown in FIGURE 10, and a gap opens up between the wall 66 of the magnet and the end wall 67 of the orifice fitting 68. When the gap occurs, the magnetic force drops off very rapidly. This is because the force of the magnet varies inversely with the square of the distance between the poles defined by the magnet's surface 66 and the end wall 67. Consequently, the pull of the magnet on the end wall 67 almost immediately is reduced to a negligible value. This causes the stem to move at once through an increment sufficient to appreciably open the orifice.

This comes about because, as the magnet releases and the widening gap reduces its effect on the stem to nil, the gas pressure shifts the diaphragm to the position established by the resisting force of the diaphragm spring. As soon as the gap appears between the end wall 67 and the surface 65 of the magnet, only the diaphragm spring effectively opposes the movement of the diaphragm and, with the fluid pressure already above a value sufficient to flex the spring, the diaphragm immediately will move to the position of spring flexure that the pressure dictates. In other words, there is a snap action to the opening of the outlet orifice as the magnet's force lets go suddenly.

The gas in the chamber under pressure represents a source of potential energy to move the diaphragm through a finite increment as soon as the stem is released by the magnet. For the snap action effect in moving a fluid control member, therefore, there should be some means of building up stored energy to the point where the force of the magnet is overcome.

The snap action achieved in this manner is a very desirable feature for a gas control device, because positive and rapid valve opening is important to complete safely and proper functioning of the control. This is further assurance that there never can be a low seepage rate of gas which is below the proper energy input for the burner. With the snap action accomplished through the use of the elastomeric magnet collar 65, therefore, the action of the regulator is even more effective and efficient than in the previously described arrangements.

The elastomeric magnet suitably may be a mixture of fine barium ferrite powder and a rubber of the buna-N or silicone type. Also, a resilient plastic such as polyvinyl chloride may be used. Where resilience is not of importance, such as where the magnet does not act as a gas-tight seal, even a nonresilient material such as a thermosetting resin may be used in conjunction with a magnetized filler. As used herein in conjunction with the magnet, the term "plastic" is intended to be used in its comprehensive sense to include both organic synthetic or processed materials and elastomeric materials.

This type of magnet will not lose its magnetism upon impact and so will not deteriorate upon repeated opening and closing of the regulator. Also, such magnets are noncorrosive, so that nothing in the gas being regulated will harm the magnet.

Figure 11:
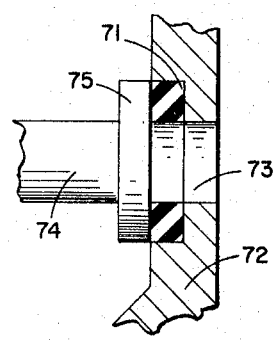
FIGURE 11 is a view similar to FIGURE 10 of an embodiment in which the magnet is carried by a stationary element and where the device acts entirely as a valve.

In the arrangement illustrated in FIGURE 11, the magnet is in the form of an annular member 71 received in a recess in a chamber 72 circumscribing an opening 73. Thus, in this construction the magnet is in a fixed portion of the unit, rather than being on a movable member as before. A stem 74 has an enlarged end plate 75 of magnetic material, which is adapted to engage the magnet 71. Of course, there will be provided a means for shifting the stem 74 to the left as the device is illustrated, biasing the end plate 75 away from the seat formed by the magnet 71. This may be a diaphragm, as in the previously described embodiments, or some other means capable of exerting an increasing force on the stem as the end plate 75 is held in place by the magnet 71. When this force achieves a sufficient value, the magnet 71 will release suddenly so that the stem 74 immediately moves away from the opening 73 and a snap action is accomplished.

As shown in the embodiment of FIGURE 11, there is no orifice pin on the end of the stem 74, and the device acts simply as a quick-opening valve. An elastomeric magnet in gas control systems, therefore, can serve both with a valve, such as in the construction of FIGURE 11, and with a combination valve and flow restrictor, as in the other versions described above.

The foregoing detailed description is to be clearly understood as given by way of illustration and example only, the spirit and scope of this invention being limited solely by the appended claims.

I claim:
1. A fluid-flow regulating device comprising
a body having a chamber therein,
    said body having an inlet to said chamber,
a pressure-responsive member in said chamber movable in response to the generation of fluid pressures in said chamber,
resilient means for opposing such movement of said pressure-responsive member,
orifice means defining an outlet for said chamber,
and restrictor means connected to said pressure-responsive member and movable thereby,
    said restrictor means extending into said orifice means for cooperation therewith,
    said restrictor means having means for providing regulated flow through said orifice means upon movement of said restrictor means by said pressure-responsive member for decreasing the area of the flow path through said orifice upon increasing movement of said restrictor means by said pressure-responsive member,
    said restrictor means and chamber including surfaces in interengagement,
        said surfaces being separable by said movement of said restrictor means by said pressure-responsive member,
        one of said surfaces being of magnet material, the other of said surfaces being of magnetic material,
            whereby said resilient means and said surfaces in interengagement cooperate to hold said restrictor means against movement by said pressure-responsive member in response to pressures in said chamber below a predetermined pressure and release said restrictor means suddenly at a pressure above said predetermined pressure as said surfaces are separated.

2. A device as recited in claim 1 in which
said one surface is of a resilient plastic magnet material for providing a gas-tight seal with the other of said surfaces when said surfaces are in interengagement.

3. A fluid-flow regulating device comprising
a body having a chamber,
    said chamber having an inlet for receiving a fluid under pressure,
    said chamber having an outlet defined by an opening of predetermined size,
a diaphragm in said chamber,
a member carried by said diaphragm and extending toward said opening,
    said diaphragm being positioned in said chamber such that fluid pressures therein react against one side of said diaphragm and urge said diaphragm in a direction to move said member away from said opening, the other side of said diaphragm being sealed from said chamber and unpressurized,
and resilient means urging said member toward said opening for opposing fluid pressure in said chamber exerted against said diaphragm,
    said member having surface portions cooperating with said opening to define passage means therethrough providing restricted flow through said opening,
        said surface portions being contoured such that said passage means progressively decreases in size upon movement of said member away from said opening,
    said chamber and said member having additional surface means in interengagement adjacent said opening,
        said surface means being separable upon movement of said member away from said opening,
        one of said surface means being of a resilient plastic magnet material,
        the other of said additional surface means being of magnetic material,
            whereby said plastic magnet material provides a fluid-tight seal for preventing flow through said outlet at pressures below said predetermined pressure and whereby an attraction is generated between said additional surface means for cooperating with said resilient means for holding said additional surface means in said interengagement and for suddenly releasing said additional surface means upon generation of said predetermined pressure in said chamber for providing a snap opening of said passage means at said outlet.

4. A fluid-flow controlling device comprising
a body having a chamber therein,
    said chamber having an inlet and an outlet,
an orifice in said outlet,
a diaphragm in said chamber opposite said orifice,
    said diaphragm having a movable portion one side of which is positioned to be reacted upon by fluid pressures in said chamber for biasing said portion of said diaphragm away from said orifice, the other side of said diaphragm being at atmospheric pressure,
a compression spring engaging said other side of said diaphragm and urging said portion of said diaphragm toward said orifice for resisting fluid pressures on said diaphragm,
and a member carried by and movable with said diaphragm and extending into said orifice,
    said member having first surface portions adjacent said orifice for substantially preventing flow therethrough,
    said member having a contour cooperating with said orifice to define passageways through said orifice upon movement of said portion of said diaphragm by said fluid pressures,
        said passageways being of maximum cross section immediately upon said movement by said fluid pressures and decreasing in cross section as said movement progresses.

5. A device as recited in claim 4 in which
said orifice is removable for permitting orifices of different lengths to be selectively provided in said outlet for cooperation with said member.

6. A fluid-flow regulating device for gas-fired appliances comprising a body having a chamber therein,
   said chamber having an inlet and an outlet,
a flexible fluid-impervious diaphragm in said body positioned so that one side thereof is engaged by fluid in said chamber while the other side thereof is substantially at atmospheric pressure, whereby said diaphragm is deflectable in response to fluid pressures in said chamber,
an orifice fitting in said outlet,
   said orifice fitting including an end wall across said outlet,
      said end wall having an aperture therethrough,
   said one side of said diaphragm being in opposed relationship and spaced from said aperture,
an elongated member carried by said diaphragm and extending therefrom,
   said member having a surface portion adjacent said aperture for shutting off flow through said aperture when said member is in one position,
a compression spring biasing said member toward said one position,
and an orifice pin carried by said member and projecting beyond said surface portion thereof,
   said orifice pin including a body portion having a contour of minimum cross section adjacent said surface portion and increasing progressively therefrom to the opposite end of said orifice pin,
   and having guide members having outer edges substantially aligned with the periphery of said aperture through said end wall,
      said diaphragm being movable in response to fluid pressure in said chamber above a predetermined value for moving said member inwardly of said aperture away from said one position and bringing said orifice pin into said aperture for thereby permitting metered fluid flow through said outlet.

7. A device as recited in claim 6 in which
said outlet is provided with screw threads,
said orifice fitting having screw threads engaging said threads of said outlet,
   said orifice fitting and said outlet having abutment surfaces in interengagement for thereby positioning said end wall of said orifice fitting with respect to said outlet.

8. A device as recited in claim 6 including
an annular elastomeric magnet circumscribing said elongated member and defining said surface portion thereof,
   said end wall of said orifice fitting being of magnetic material and engaged by said magnet when said elongated member is in said one position,
   said magnet being spaced from said end wall when said elongated member is moved inwardly away from said one position,
      whereby said magnet produces a force tending to hold said elongated member in said one position which force diminishes rapidly upon said inward movement of said elongated member so that said outlet is opened with a snap action.

9. In combination with a gas having a predetermined heat content and specific gravity, and a burner for said gas, a gas-flow regulating device for providing said burner with a substantially constant energy input at gas pressures below a predetermined value, said device comprising
a body having a chamber therein,
   said chamber having an inlet for receiving pressurized gas
   and an outlet for discharging said gas,
      said outlet being connected to said burner for supplying pressurized gas thereto,
an orifice in said outlet,
a diaphragm in said chamber opposite said orifice,
a member carried by said diaphragm and extending into said orifice,
   said diaphragm being positioned in said chamber for receiving on one surface thereof a reaction from pressurized gas in said chamber such that said gas exerts a force on said diaphragm for moving said diaphragm away from said orifice, the opposite surface of said diaphragm being substantially at atmospheric pressure,
force means for resisting movement of said diaphragm by said reaction from pressurized gas,
   said force means including resilient means biasing said diaphragm toward said orifice and urging said member to a position where said member is inserted relatively far into said orifice,
   said force means exerting a force of a magnitude such that said diaphragm can overcome said force means for moving said member therewith and partially withdrawing said member from said orifice only at pressures in said chamber above a predetermined magnitude,
      with the movement of said diaphragm and said member increasing as pressures in said chamber increase above said predetermined magnitude,
   said member having first surface portions adjacent said orifice in said position where said member is inserted relatively far into said orifice for shutting off flow through said orifice to said burner,
   said member having additional surface portions adjacent said orifice for providing a restricted passageway through said orifice when said member is partially withdrawn from said orifice,
      said additional surface portions being contoured relative to said orifice, said resilient means and said diaphragm to vary the area of said passageway such that gas flowing through said orifice to said burner transmits energy to said burner according to the formula:

$$\frac{\text{Burner energy input}}{\text{Fuel heat content}} = \text{constant} \times \text{orifice area} \sqrt{\frac{\text{gas pressure}}{\text{gas specific gravity}}}$$

10. A fluid-flow control device comprising
a body having a chamber therein,
an inlet for said chamber for receiving fluid,
a movable member movable between
   a first position in which said movable member obstructs fluid flow through said outlet
   and a second position where fluid flow through said outlet is relatively unobstructed,
magnet means for holding said movable member in said first position,
   said magnet means including a permanent plastic magnet and a member of magnetic material in interengagement when said movable member is in said first position and separated increasingly upon movement of said movable member away from said first position toward said second position,
a first resilient biasing means urging said movable member toward said first position, and a second biasing means engaging said movable member for urging said movable member toward said second position,
   said second biasing means including means for producing an increasing force on said movable member sufficient to increase to a value greater than the force exerted by said first resilient biasing means and said magnet means so that said magnet means releases said movable member when said force value is reached and said second biasing means imparts sudden movement to said movable member.

11. A valve device for controlling the flow of a pressurized fluid comprising
a body having a chamber,
an inlet to said chamber for receiving pressurized fluid,
an outlet for said chamber,
a movable member at said outlet,
a valve seat member at said outlet,
said movable member being movable between a first position in engagement with said valve seat member for closing said outlet
and a second position remote from said valve seat member for opening said outlet,
and a seal carried by one of said members for sealing said outlet upon such engagement,
said seal being of elastomeric magnet material,
the other of said members being of magnetic material so that an attraction is produced between said seal and said other member for holding said movable member over said outlet to close said outlet and for releasing said movable member suddenly upon biasing of said movable member toward said second position by the exertion of an increasing force so that a snap action is achieved in opening said valve.

12. A device as recited in claim 11 including in addition
a condition-responsive means for moving said movable member toward said second position in opposition to the force generated by said elastomeric magnet.

13. A device as recited in claim 12 in which said condition-responsive means comprises
a pressure-responsive diaphragm in said chamber for movement in response to the generation of predetermined pressures in said chamber,
and including in addition restrictor means on said movable member for controlling the flow of fluid through said outlet upon movement of said movable member away from said valve seat member toward said second position.

14. A gas-flow regulating device for gas-fired appliances comprising
a body having a chamber therein,
said chamber having an inlet and an outlet,
a flexible fluid-impervious diaphragm in said body positioned such that one side of said diaphragm is reacted upon by gas received in said chamber from said inlet,
said diaphragm having a periphery sealed relative to said chamber so that the opposite side of said diaphragm is remote from gas received in said chamber from said inlet and is substantially at atmospheric pressure,
a member engaging said diaphragm and extending therefrom toward said outlet,
said member being movable between a first and a second position relative to said outlet,
said member having a surface portion adjacent said outlet for shutting off flow through said outlet when said member is in said first position,
said member having other surface portions for providing a restricted flow path of progressively decreasing area through said outlet upon movement of said member from said first position to said second position,
and resilient means biasing said member toward said first position,
said member being movable away from said first position toward said second position upon movement of said diaphragm in response to gas pressure in said chamber reacting against said one side of said diaphragm,
said member and said outlet including magnet means for holding said member in said first position and allowing movement away from said first position toward said second position to permit flow through said outlet only upon the presence of sufficient gas pressure in said chamber to overcome the force of said magnet means and said resilient means.

References Cited

UNITED STATES PATENTS

| | | | |
|---|---|---|---|
| 1,363,470 | 12/1920 | Knudsen | 239—533 |
| 2,210,783 | 8/1940 | Tabb et al. | 239—460 |
| 2,263,197 | 11/1941 | Tabb et al. | 239—460 |
| 2,470,717 | 5/1949 | Palumbo | 239—533 |
| 2,775,484 | 12/1956 | Fox | 239—533 |
| 3,004,604 | 10/1961 | Limbocker | 251—65 |

EVERETT W. KIRBY, *Primary Examiner.*

M. HENSON WOOD, JR., *Examiner.*

R. S. STROBEL, *Assistant Examiner.*

Dedication 3,327,950.—*Ralph E. Solomon*, Los Angeles, Calif. FLUID-FLOW CONTROL DEVICE. Patent dated June 27, 1967. Dedication filed Oct. 13, 1969, by the assignee, *Controls Company of America*.

Hereby dedicates to the Public the entire terminal part of the term of said patent.

[*Official Gazette January 20, 1970.*]